(12) United States Patent
Gillispie et al.

(10) Patent No.: US 8,287,614 B2
(45) Date of Patent: Oct. 16, 2012

(54) SUPPLEMENTAL FILTER MEDIA SUPPORT INSERT FOR AN AIR CLEANER

(75) Inventors: Grant Gillispie, Fayetteville, NC (US); John Chamberlin, Chesterfield, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 447 days.

(21) Appl. No.: 12/538,449

(22) Filed: Aug. 10, 2009

(65) Prior Publication Data

US 2011/0030322 A1     Feb. 10, 2011

(51) Int. Cl.
   *B01D 46/52*    (2006.01)
   *F02M 35/024*   (2006.01)

(52) U.S. Cl. ............. 55/499; 55/385.3; 55/497; 55/501; 55/503; 55/521

(58) Field of Classification Search ................ 55/385.3, 55/497, 499, 501, 503, 521; 123/198 E
   See application file for complete search history.

(56) References Cited

U.S. PATENT DOCUMENTS

| | | | | |
|---|---|---|---|---|
| 4,713,097 A | * | 12/1987 | Grawi et al. | 96/380 |
| 5,213,596 A | * | 5/1993 | Kume et al. | 55/481 |
| 6,152,980 A | * | 11/2000 | Culwell | 55/481 |
| 6,736,871 B1 | * | 5/2004 | Green et al. | 55/385.3 |
| 6,837,920 B2 | | 1/2005 | Gieseke et al. | |
| 6,852,141 B2 | | 2/2005 | Bishop et al. | |
| 6,890,366 B2 | * | 5/2005 | Bugli et al. | 55/385.3 |
| 7,360,530 B2 | * | 4/2008 | Oda et al. | 123/518 |
| 7,699,912 B2 | * | 4/2010 | Uemura et al. | 96/134 |
| 7,879,124 B2 | * | 2/2011 | Uemura et al. | 55/506 |
| 2006/0108278 A1 | | 5/2006 | Scholl et al. | |
| 2006/0288672 A1 | | 12/2006 | Miyake et al. | |
| 2007/0193236 A1 | | 8/2007 | Merritt | |
| 2007/0245700 A1 | | 10/2007 | Zhu | |
| 2008/0034974 A1 | | 2/2008 | Uemura | |
| 2010/0236205 A1 | * | 9/2010 | Braithwaite et al. | 55/499 |

FOREIGN PATENT DOCUMENTS

| | | |
|---|---|---|
| WO | WO97/40910 | 11/1997 |
| WO | WO00/50149 | 8/2000 |
| WO | WO2009/071626 | 6/2009 |

OTHER PUBLICATIONS

PCT Search report PCT/EP2010/061531.

* cited by examiner

*Primary Examiner* — Robert Clemente
(74) *Attorney, Agent, or Firm* — James Hasselbeck

(57) ABSTRACT

A supplemental filter media support insert is provided for use with a filter element to reinforce the filter media against filter media deformation resulting from fluid flow induced forces. The support insert is configured for installation into an air cleaner near the filter outlet face and includes support ribs which may be generally aligned to overlay reinforcement bands provided on filter media.

12 Claims, 3 Drawing Sheets

SUPPLEMENTAL FILTER MEDIA SUPPORT INSERT FOR AN AIR CLEANER

TECHNICAL FIELD

The present invention relates to engine air intake systems, air cleaners and air filters for such systems and, more particularly, to apparatus configured to provide supplemental support and stability to air filter media.

BACKGROUND OF THE INVENTION

Filter elements find application in the removal of various types of contaminants from gaseous or liquid fluid streams.

One application is in filtering combustion air before its delivery to an internal combustion engine. A typical source for combustion air is air drawn from outside of the vehicle, which commonly includes particulate contaminants present in the operating environment. An air cleaner which includes an air filter element is normally provided in the air induction system so as to capture these particulate contaminants, removing them from the air flow stream before the combustion air is delivered to the vehicle engine.

Filters are provided with filter media generally configured to have relatively small air flow permeable pores. The size of the pores are sized to permit the air flow or fluid stream to pass as freely as possible while being sufficiently small in size so as to block the passage of undesired particulate contaminants. Pleated filter media is often used in air filter applications. Typically the pleated media is provided in a flat rectangular shaped filter element. A gasket is typically formed about the periphery of the filter media and is configured for sealing against a filter element housing, such as an air cleaner housing.

In the case of an air filter, the presence of a filter media in the intake air stream acts to restrict air flow and thereby has a secondary effect of producing a pressure differential or pressure drop between the filter element inlet and outlet faces (i.e. across the filter media of the filter element). The pressure drop is related to the mass air flow and also related to the amount of accumulated occlusion or blockage of the air filter media. This air flow induced pressure drop acts to create deflection forces in the filter media of the filter element. These deflection forces are aligned with the air flow direction and, (for example) in pleated panel type air filters, the deflection forces are typically normal to plane defined by the filter element media. These deflection forces tend to distort or deform the filter media from its original unstressed shape.

Air filter elements are often made of pleated filter paper media as folded or pleated filter elements are relatively inexpensive and are easily produced. In automotive air filter applications, the pleated filter media may be secured to a periphery support frame, such as a molded plastic or elastomeric frame that is configured to support and provide a periphery seal to the filter element within an air cleaner housing. Pleating the filter paper media in a given size filter element increases the available filter surface area, while the folded "V" shaped or zig-zag pleats provide additional structural support to the filter media of the filter element against deformation or deflection due to air flow induced forces. In normal operating conditions, the inherent stiffening provided by the "V" shaped pleats in the filter media may be sufficient to resist the deflective forces of the filtered fluid stream.

In some operating conditions, however, the structural strength provided by the filter media pleats may be insufficient to support the filter media and prevent possible media failure. One example may be when a vehicle engine together with its associated induction air filter is operated in adverse weather conditions. Operation in an adverse climate can substantially increase deflection force loading on the media of the filter element. In cold climates the air filter may draw in accumulations of snow and ice pellets. The passage of drawn-in snow is blocked by the filter element and therefore accumulates at the dirty side (or inlet face) of the filter element, acting to further block air flow through the filter element thereby increasing the pressure drop across the filter element together with an increase in deflection forces acting upon the filter media. Similarly, some varieties of filter media are hydrophilic while some other types are hydrophobic. Hydrophilic media such as types of filter paper are prone to absorbing water droplets from the intake air stream, for example if operated in rainy or dense fog conditions. Water may wet the filter media; obstructing air flow pores in the media resulting in a further obstructed air flow through the media with the resultant further increase in pressure drop and resultant deflection forces and undesired deformation of the filter media.

Filter media may also become unduly obstructed with particulates due to extended operating intervals between maintenance and change out or alternately due to operation in dust laden environments. Particulates and debris accumulate on the air filter media at the filter inlet face increasing the occlusion of the filter media thereby reducing the air flow permeable area of the filter with a resulting increase in the pressure drop across the filter media.

In the art it is known to provide glue beads (also known as adhesive beads) arranged to bridge across and between filter media pleats to address some of these issues. An adhesive such as hot melt glue has been used to provide the beads. The glue beads help to lock the pleats into place, provide additional structural support to the filter element pleats and improve the resistance of the pleats to folding (one pleat folding onto an adjacent pleat) as well as resistance to deformation or crowning of the filter media. Multiple adhesive or glue beads may be applied to the pleated filter media, typically in a spaced parallel relationship extending across the pleats. Unfortunately, filter media is typically formed of filter media varieties affected by exposure to moisture, for example varieties of filter paper. This being the case, such filter media are still preferred as they are effective filtering agents and low in cost. The presence of water may weaken the filter media and compromise the adhesive binding of the glue beads to the pleated filter media, or result in localized tearing or failure of the filter media when exposed to air flow pressure forces. Additionally, glue beads are typically of the "hot melt" variety and hence are weakened or compromised by exposure to elevated temperatures such as may be experienced in the engine compartment of a motor vehicle. Such beads may "age" over time and become brittle and crack. Cracks or gaps compromise the ability of the glue beads to carry tensile loads such as required to resist filter media deformation or crowning. Even in non-adverse conditions glue beads provide a less than ideal solution to filter media deformation and filter media support problems discussed above, so the problem remains.

As can be seen, there remains a need in the art for a support apparatus to provide supplemental support to the filter media, thereby overcoming problems in the prior art filter elements, including those with varieties of glue bead stiffeners. Preferably this support apparatus solves the problems identified above, is usable with currently available varieties of filter elements, and can be realized without unduly increasing air cleaner or filter element cost or complexity.

SUMMARY OF THE INVENTION

A primary object of the present invention is to provide a supplemental filter media support insert configured for use with a filter element and operative to reinforce the filter media against filter media deformation resulting from fluid flow induced forces, is low in cost and may be applied to new air cleaner products or, in some embodiments, may retrofit into existing air cleaners. The support insert is configured for installation into an air cleaner in a position proximate to the filter outlet face and includes one or more support ribs which may be generally aligned to overlay reinforcement bands provided on filter media. Reinforcing bands also include varieties of glue beads discussed in the background section above.

In one aspect of the invention, an air cleaner includes an air cleaner housing defining a chamber and having a dirty air side in communication with an air inlet port of the housing and a clean air side in communication with an air outlet port of the housing. An air filter element is received in the chamber of the housing and divides the chamber into the clean and dirty sides. The filter element is configured and adapted so that when installed into the housing, the filter element is operative to filter air flow passing from the inlet to the outlet. Air flow through the filter media develops a pressure drop across the filter media. The developed pressure drop is operative to induce a deflection force urging the filter media to deform from a desired filter media shape. The air cleaner further includes a supplemental filter media support insert operative to provide supplemental support to the filter media to reduce filter media deformation. The support insert includes at least one elongated support rib positioned in the clean air side proximate to and extending across the outlet face of the filter media. The support ribs are configured to supportively resist deformation of the filter media by transferring at least a portion of the deflection force to the housing.

In another aspect of the invention, the air cleaner housing comprises a first housing portion including the inlet port and the dirty air side of the chamber and a second housing portion including the outlet port and the clean air side of the chamber. The first and second housing portions are configured and adapted to closeably mate to form the air cleaner housing and define the chamber within.

In another aspect of the invention, the filter media includes a pleated filter media; and the support ribs are positioned to have an angular alignment different from an angular alignment of the filter media pleats.

In another aspect of the invention, the supplemental filter media support insert further includes a periphery band sized and configured to be received into the second housing portion and to receive mechanical support from the second housing portion. At least one end of each support rib is secured to the periphery band to provide the transfer of at least a portion of the deflection force to the air cleaner housing.

In another aspect of the invention, at least a portion of the support ribs are secured at opposing ends of the ribs to the periphery band.

In another aspect of the invention, the filter media comprises folded filter media sheets forming pleats. The filter element includes at least one reinforcement band extending over at least a portion of the pleats at the outlet face of the filter. At least a portion of the support ribs are positioned and aligned for supportive engagement with the reinforcing bands of the filter element. The aligned ribs have a width across the outlet face no greater than the width of the aligned reinforcing band. The positioning, alignment and rib width are selected to avoid further restriction of air flow through the filter element.

In another aspect of the invention, the supplemental filter media support insert further includes at least one transverse rib crossing over and joined to at least one of the support ribs. The support ribs are aligned in a first direction and positioned in a spaced parallel arrangement. The transverse ribs are aligned in a second direction and positioned in a spaced parallel arrangement. The first and the second directions are chosen such that an angle between the first and second directions is between 10 and 90 degrees.

In another aspect of the invention, the second housing portion further includes at least one mounting feature secured to an interior wall of the second housing portion and are configured such that opposing ends of the support ribs engage with the mounting features so as to transfer the at least a portion of the deflection force to the air cleaner housing through the ribs and mounting features.

In another aspect of the invention, the filter media includes pleated filter media. The filter element includes at least one reinforcement band extending over at least a portion of the pleats at the outlet face. At least a portion of the support ribs are positioned and aligned for supportive engagement with at least one of the reinforcing bands. The so aligned ribs have a width across (or relative to) the outlet face no greater than the width of the aligned reinforcing band. The positioning, alignment and rib width are selected to avoid further restriction of air flow through the filter element.

In another aspect of the invention, at least one transverse rib is provided and crosses over and/or joins with at least one of the support ribs. The support ribs are aligned in a first direction and positioned in a spaced parallel arrangement. The transverse ribs are aligned in a second direction and positioned in a spaced parallel arrangement. The first and the second directions are chosen such that an angle between the first and second directions is between 10 and 90 degrees.

In another aspect of the invention, at least some of the support ribs and/or transverse ribs are secured to the mounting features by heat staking.

In another aspect of the invention, the periphery band is secured to the second housing by one of: snap fit installation, friction welding, or adhesives.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1A:
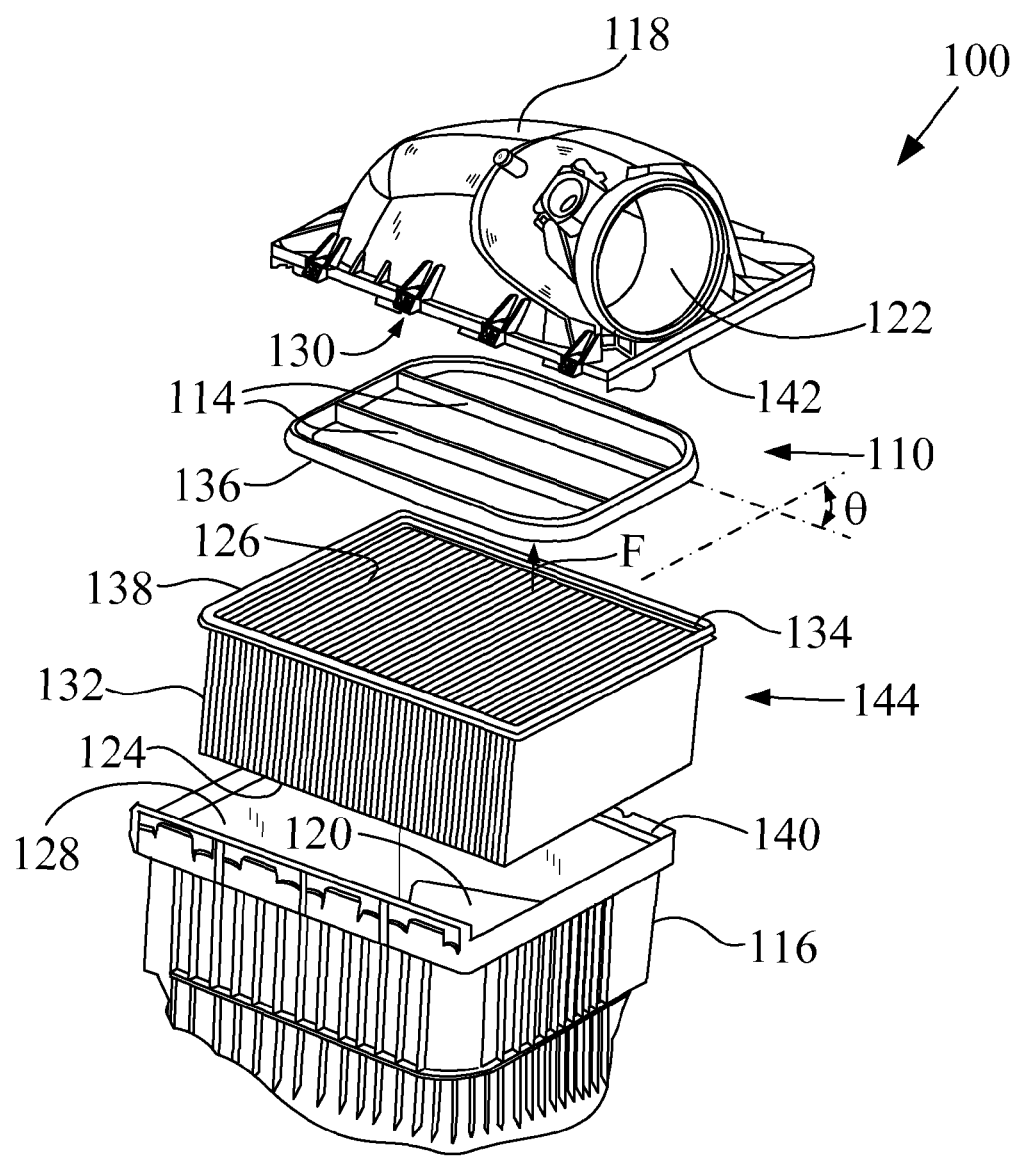
FIG. 1A is an exploded assembly view of one embodiment of an air cleaner including a supplemental filter media support insert, consistent the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a supplemental filter media support insert for an air cleaner. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention generally relates to a supplemental filter media support insert for an air cleaner including a filter element which, in some embodiments, the filter element is a pleated filter element. In the art it is known to provide glue beads (also known as adhesive beads) arranged to bridge across and between filter media pleats. An adhesive such as hot melt glue or alternately glue strings may be used to provide the beads. The glue beads help to lock the pleats into place, provide additional structural support to the filter element pleat and improve the resistance of the pleats to folding (one pleat folding onto an adjacent pleat) as well as resistance to deformation or crowning of the filter media. In the filter element art multiple adhesive or glue beads may be applied to the pleated filter media, generally in a spaced parallel relationship. Unfortunately, filter media is typically formed of filter media affected by water, for example varieties of filter paper. The presence of water may weaken the filter media and compromise the adhesive binding of the glue beads to the pleated filter media, As noted earlier, glue beads are typically of the "hot melt" variety and hence are also weakened or compromised by exposure to elevated temperature such as may be experienced in the engine compartment of a motor vehicle. Even in non-adverse conditions glue beads provide a less than ideal solution to filter media deformation or crowning.

In the present invention a supplemental support insert is configured and adapted to provide additional mechanical support to the filter media so as to further strengthen the filter element media to resist undesired media shape distortion or possibly even mechanical failure of the filter media when under the influence of fluid flow induced forces. The supplemental support insert may itself receive support by supportively engaging with complimentary configured features provided within the filter housing/air cleaner. In the event of filter media obstruction such as the accumulation of dirt/debris at the inlet face of the filter or snow pack accumulation in the case of an automotive engine operating in adverse weather conditions, the invention functions to provide supplemental support to the filter media.

The supplemental filter media support insert of the present invention may, in some embodiments, include a periphery band sized and configured to be supportively received into the clean air side of the filter housing. The supplemental filter media support insert includes at least one rib bridging across a gap defined interior to the periphery band. The ribs are configured to provide filter media support to a filter element, preventing the filter element from deforming or in some cases collapsing when operating under severe pressure drop conditions (for example, potentially when the filter is substantially occluded). The support ribs of the retention insert are positioned substantially over and aligned with locations of filter element reinforcement bands (if present) on the air filter element, thereby overlaying the reinforcement bands so the presence of the support ribs do not result in any further restriction of air flow through the filter element FIG. 1A is an exploded assembly view of one embodiment of an air cleaner including the supplemental filter media support insert, consistent with the present invention. In the illustrated embodiment the air cleaner 100 includes a first housing portion 116 and a second housing portion 118. The second housing portion in the illustrated embodiment may alternately be considered as an air cleaner cover or lid. The first 116 and second 118 air cleaner housing portions are shaped, sized and configured for closeably mating along mateable flange portions 140 and 142. The first housing portion 116 has formed therein an air inlet port 120 through which air to be filtered is admitted into the air cleaner housing. Similarly, the second housing portion 118 includes an air outlet port 122 through which filter air from the air cleaner 100 is delivered, such as to the air intake tract of an internal combustion engine (not shown). The air inlet port 120 is in air flow communication with the dirty air side 128 of the chamber and also in communication with the inlet face 124 of the filter media 132 of the air filter element 144. Similarly the air outlet port 122 is in air flow communication with the clean air side 130 of the chamber and also in communication with the outlet face 126 of the filter media 132.

The air filter element, in the illustrated case a pleated air filter element 144, is sized and configured to be received into the interior of the air cleaner housing (mated combination of 116 and 118). The second housing portion 118, when closeably mated onto the first air cleaner housing portion 116, defines a chamber therein in which the filter element 144 is retained. The chamber is divided into a clean air side 130 and a dirty air side 128 by the presence of the air filter element 114 in the air cleaner housing (116 and 118).

Figure 1B:
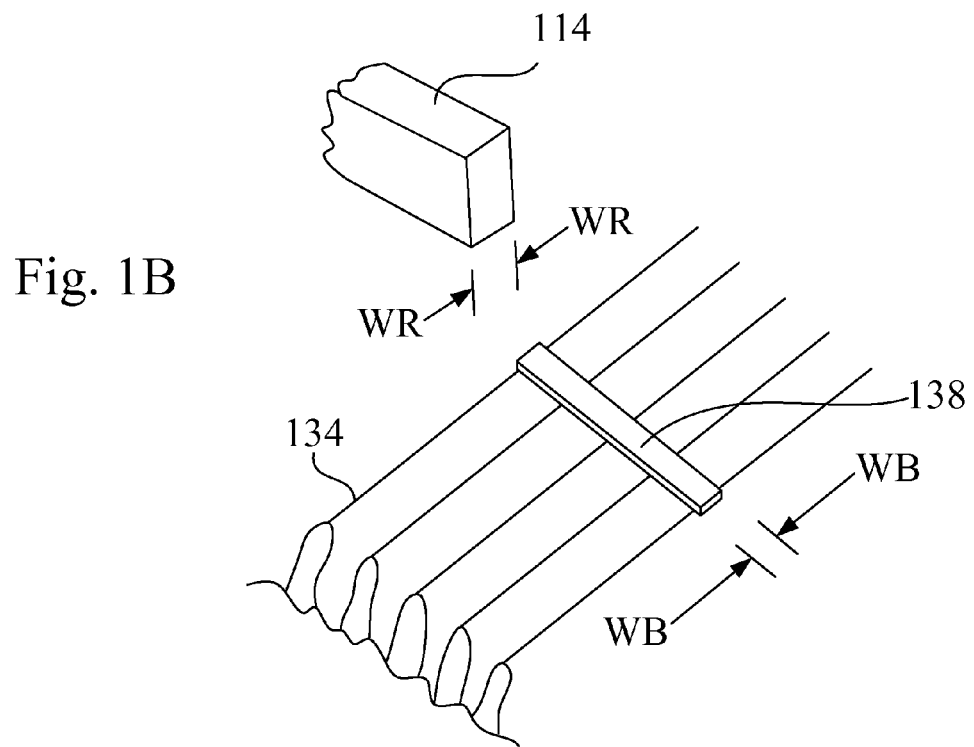
FIG. 1B is a schematic illustration of a portion of the pleated filter media of FIG. 1, illustrating the reinforcing bands provided on the filter media and the overlay placement of the support ribs of the supplemental filter media support insert.

In operation, air flow enters the air inlet port 120 of the first housing portion 116, flows upwards (relative to the illustrated arrangement of FIG. 1) to enter the air filter element 144 at the inlet face 124 of the filter media. The filter media 132 is a porous air flow permeable media which may be formed from fibrous filter sheet media that, by intentional design, blocks the passage of particulates through the filter media 132. As is known in the art, the effective filter area of given size planar filter element may be increased by folding the filter media sheets into pleats, for example, forming the pleated filter media 132.

The small size pores of the filter media 132 present a restriction to the air flow through the pleated filter media 132, thereby resulting in a pressure drop between the inlet face 124 and the outlet face 126 of the filter media 132. This restriction of the air flow through the filter media 132 induces as deflection force F in the filter media that acts to urge the pleated filter media 132 to distort or deform from the desired shape of the pleated filter media. For example, as illustrated in FIG. 1, the outlet face 126 of the pleated filter media 132 has a desired shape that is substantially planar. The action of deflection force F on the filter media 132 may urge the filter media 132 to deform or "dome" upwards into the clean air side 130 of the chamber within the second housing portion 118, and may eventually contribute to failure of the filter element 144, thereby resulting in unfiltered air reaching the outlet port 122 which is, of course, highly undesired.

Advantageously, the present invention addresses this problem by providing a supplemental filter media support insert 110 configured to provide supplemental support to the filter media 132 to resist the deflection force F by transferring at least a portion of this deflection force F to the air cleaner housing, specifically in FIG. 1 the second housing portion 118. In the aspect of the invention illustrated in FIG. 1, the supplemental filter media support insert 110 includes a periphery band 136 that is sized and configured to be received into the second housing portion 118 and to receive mechanical support from the second housing portion, the supplemental support insert 110 enabling the transfer of a portion of the deflection force F to the air cleaner housing portion 118. In FIG. 1, two elongated support ribs 114 in the clean air side 130 are positioned proximate to and extend across a portion of the outlet face 126 of the filter media 132. The support ribs 114 are secured at their opposing ends to the periphery band 136 and are configured to supportively resist deformation of the filter media 132 by transferring at least a portion of the air flow induced deflection force F from the filter media 132 to the second housing 118. It is intended that the supplemental filter media support insert 110 may include any number of elongated support ribs 114 and that these ribs may be positioned as desired to adequately support the filter media 132 against deformation.

Advantageously, the elongated support ribs 114 are positioned to have an angular alignment different from an angular alignment of the filter media pleats 134, where this angular difference is indicated by label θ (theta) in FIG. 1. Preferably the elongated support ribs do not have an angular alignment that coincides with the pleat alignment but instead have an angular alignment that permits elongated support ribs 114 to each span across and provide support to a plurality of filter media pleats 134.

The filter element 144 as provided by the manufacturer may include one or more reinforcing bands 138 extending over at least a portion of the pleats 134 at the outlet face 126. One or more of these reinforcing bands 138 may be provided, typically in a spaced parallel arrangement on the outlet face 126. In some filter elements the reinforcing bands 138 are realized as elongated glue beads applied to and extending across the tips of the pleats 134. For our discussions herein, the reinforcing bands 136 may be characterized as having a width WB (see FIG. 1B) that partially occludes (although to a small extent) the outlet face 126 of the filter element 144. This being the case, advantageously the elongated support ribs 114 of the supplemental filter media support insert 110 can be spaced, positioned and aligned so as to overlay the reinforcing bands 138. If the width WR of the support ribs is selected to be less than or equal to the width WB of the reinforcing bands 138 of the filter element 144, then advantageously the support ribs 114 directly overlay the reinforcing bands 138 and do not further occlude the outlet face 126 of the filer element 144. In this way a further restriction of the air flow through the filter element 144 due to the presence of the support ribs 114 can be avoided.

Figure 2A:
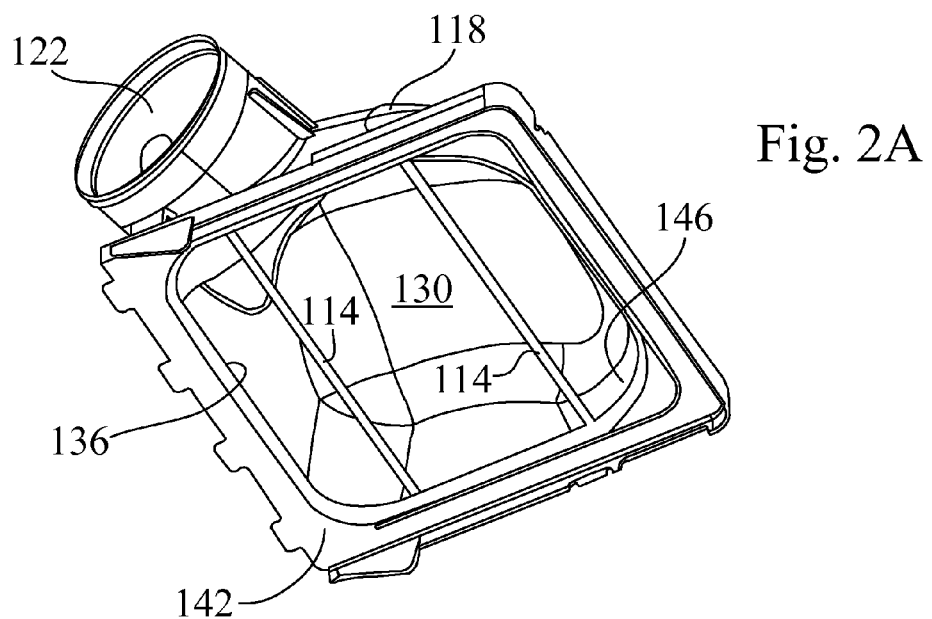
FIG. 2A illustrates the supplemental filter media support insert of FIG. 1A illustrating its snap fit installation into the interior of the air cleaner housing, consistent the present invention.
Figure 2B:
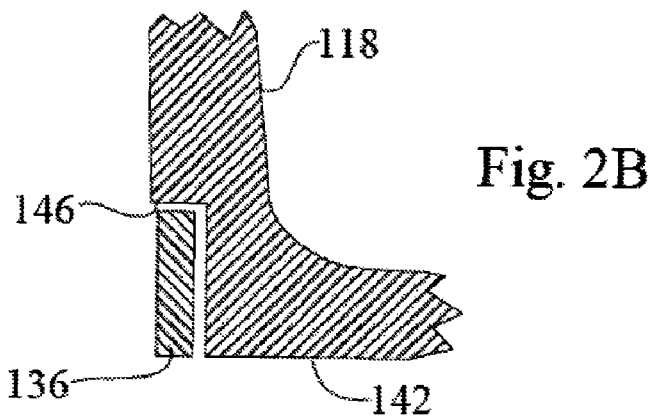
FIG. 2B is a schematic sectional view of a portion of the air cleaner housing and periphery band of FIG. 2A illustrating the snap fit feature.

FIG. 2B is a schematic sectional view of a portion of the air cleaner housing and periphery band of FIG. 2A illustrating one embodiment of a snap fit installation of supplemental filter media support insert 110 of FIG. 1A into the interior of an air cleaner housing (such as the second housing portion 118). In FIG. 2A, the periphery band 136 is shaped, sized and configured to be supportably received into the second housing portion 118 in a location placing the support ribs 114 in a position to be engageable against the pleats 134 of the filter element 144. The snap fit installation may be achieved by a clearance fit of the periphery band 136 into the interior rim 146 of the second housing element 118. In some embodiments the interior rim 146 may be realized by an L-shaped pocket 146 formed into the interior of the second housing portion 118 as depicted schematically in sectional view 2B. Alternately, the periphery band 136 may be secured into the housing 118 by other methods including friction welding, laser welding, a suitable adhesive or heat staking (as discussed below).

Figure 3:
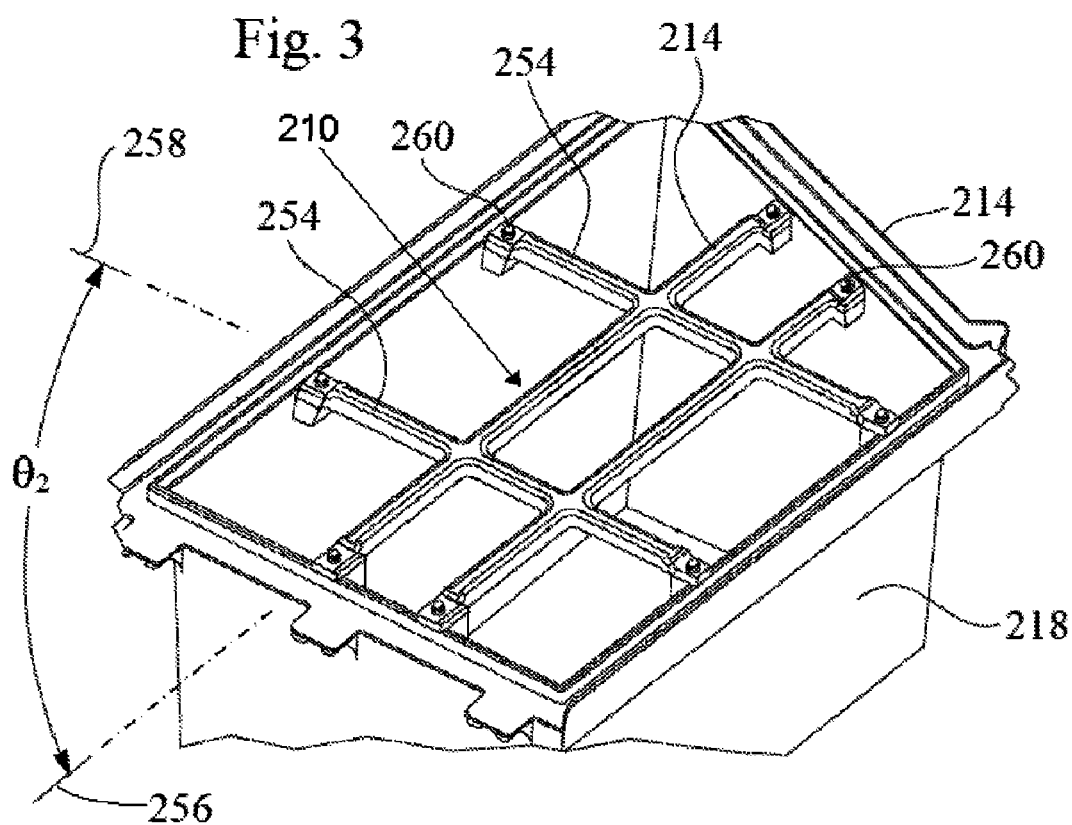
FIG. 3 illustrates another embodiment of a supplemental filter media support insert configured for heat staking into the air cleaner housing, consistent the present invention.

FIG. 3 illustrates another embodiment of a supplemental filter media support insert 210 configured for heat staking into the air cleaner housing (such as second housing portion 218). In this embodiment, the supplemental filter media support insert 210 includes one or more (for discussion herein, quantity two illustrated in FIG. 3) elongated support ribs 214. Support ribs 214 are positioned and aligned to provide supportive engagement with the outlet face 126 of the filter media 132. As discussed with FIG. 1B earlier, preferably the support ribs 214 are positioned and aligned to overlay and supportively engage the reinforcing bands 138 of the filter element 144. Preferably the support ribs 214 have a width WR that is no greater that the width WB of the reinforcing bands 138 of the filter element 144, thereby minimizing further restriction of the air flow through the outlet face 126 of the filter element 144, as discussed earlier herein.

As illustrated in FIG. 3, various configurations of the supplemental filter media support insert 210 may optionally include one or more transverse ribs 254 (for discussion herein, quantity two illustrated in FIG. 3). Each transverse rib 254 crosses over and is joined to at least one of the support ribs 214. In some embodiments the support ribs 214 may be positioned into a space parallel relationship and aligned together in a first direction (as indicated by axis labeled 256 in FIG. 3). Similarly, the transverse ribs may be positioned in a spaced parallel relationship and aligned in a second direction (indicated by axis labeled 258 in FIG. 3). The first 256 and second 258 directions are preferably chosen such that the angle θ2 (theta2) between the first 256 and second 258 directions is between 10 and 90 degrees, with angles closer to 90 degrees preferred.

In some embodiments, the support ribs 214 and/or the transverse ribs 254 may be secured to the air cleaner housing 218 by heat stakes 260. Heat stakes may be realized as plastic protrusions formed into the housing. The protrusions are sized to be received through bores provided at the ends of the support ribs 214 and/or transverse ribs 254. Heat stakes 260 are activated to secure the ribs 214, 254 by the application of sufficient heating to deform the heat stakes to compress against the ends of the ribs. Alternately the ribs 214, 254 may be secured to the housing 218 by other means including friction welding, ultrasonic welding, laser welding, screws, various type of mounting clips or hardware or by the use of a curable or heat activated adhesive.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air cleaner, comprising:
   an air cleaner housing defining a chamber having dirty air side in communication with an air inlet port of said housing and a clean air side in communication with an air outlet port of said housing;
   an air filter element received in said chamber of said housing and dividing said chamber into said clean and dirty sides,
      said filter element having a filter media having a desired shape and configured to filter air flow passing from said inlet to said outlet,
      said filter media having an inlet face in communication with said inlet port and
      an outlet face in communication with said outlet port,
      wherein said air flow through said filter media develops a pressure drop across said filter media, said pressure drop inducing a deflection force urging said filter media to deform from said desired shape,
   a supplemental filter media support insert installed into an interior of said air cleaner housing and not secured to said filter element, said supplemental filter media support including:
      at least one elongated support rib in said clean air side, positioned proximate to and extending across said outlet face,
      said ribs configured to supportively resist deformation of said filter media by transferring at least a portion of said deflection force to said housing;
   wherein said housing comprises:
      a first housing portion including said inlet port and said dirty air side of said chamber;
      a second housing portion including said outlet port and said clean air side of said chamber;
      wherein said first and second housing portions are configured and adapted to closeably mate to form said air cleaner housing;
   wherein said filter media comprises pleated filter media;
   said filter element includes at least one reinforcement band extending over at least a portion of said pleats at said outlet face; and
   wherein at least a portion of said support ribs are positioned and aligned for supportive engagement with at least one of said reinforcing bands, said aligned ribs having a width across said outlet face no greater than a width of said aligned reinforcing band, said positioning, alignment and rib width selected to avoid further restriction of air flow through said filter element.

2. The air cleaner of claim 1, wherein
   said support ribs are positioned to have an angular alignment different from an angular alignment of said pleats.

3. The air cleaner of claim 1, wherein said supplemental filter media support insert further comprises:
   a periphery band sized and configured to be received into said second housing portion and to receive mechanical support from said second housing portion;
   wherein said at least one end of said support ribs is secured to said periphery band to provide said transfer of at least a portion of said deflection force to said air cleaner housing.

4. The air cleaner of claim 3, wherein
   at least a portion of said ribs are secured at opposing ends of said ribs to said periphery band.

5. The air cleaner of claim 1, wherein
   said second housing portion further comprises at least one mounting feature secured to an interior wall of said second housing portion; and
   wherein opposing ends of said support ribs engage with said mounting features to transfer said at least a portion of said deflection force to said air cleaner housing.

6. An air cleaner comprising:
   an air cleaner housing defining a chamber having dirty air side in communication with an air inlet port of said housing and a clean air side in communication with an air outlet port of said housing;
   an air filter element received in said chamber of said housing and dividing said chamber into said clean and dirty sides,
      said filter element having a filter media having a desired shape and configured to filter air flow passing from said inlet to said outlet,
      said filter media having an inlet face in communication with said inlet port and
      an outlet face in communication with said outlet port,
      wherein said air flow through said filter media develops a pressure drop across said filter media, said pressure drop inducing a deflection force urging said filter media to deform from said desired shape,
   a supplemental filter media support insert including:
      at least one elongated support rib in said clean air side, positioned proximate to and extending across said outlet face,
      said ribs configured to supportively resist deformation of said filter media by transferring at least a portion of said deflection force to said housing;
   wherein said housing comprises:
      a first housing portion including said inlet port and said dirty air side of said chamber;
      a second housing portion including said outlet port and said clean air side of said chamber;

wherein said first and second housing portions are configured and adapted to closeably mate to form said air cleaner housing;
wherein said supplemental filter media support insert further comprises:
a periphery band sized and configured to be received into said second housing portion and to receive mechanical support from said second housing portion;
wherein said at least one end of said support ribs is secured to said periphery band to provide said transfer of at least a portion of said deflection force to said air cleaner housing;
wherein said filter media comprises folded filter media sheets forming pleats;
said filter element includes at least one reinforcement band extending over at least a portion of said pleats at said outlet face; and
wherein at least a portion of said support ribs are positioned and aligned for supportive engagement with said reinforcing bands,
said aligned ribs having a width across said outlet face no greater than a width of said aligned reinforcing band,
said positioning, alignment and rib width selected to avoid further restriction of air flow through said filter element.

7. The air cleaner of claim 6, said supplemental filter media support insert further comprising:
at least one transverse rib crossing over and joined to at least one of said support ribs;
wherein said support ribs are aligned in a first direction and positioned in a spaced parallel arrangement;
wherein said transverse ribs are aligned in a second direction and positioned in a spaced parallel arrangement; and
wherein said first and said second directions are chosen such that an angle between said first and second directions is between 10 and 90 degrees.

8. An air cleaner comprising:
an air cleaner housing defining a chamber having dirty air side in communication with an air inlet port of said housing and a clean air side in communication with an air outlet port of said housing;
an air filter element received in said chamber of said housing and dividing said chamber into said clean and dirty sides,
said filter element having a filter media having a desired shape and configured to filter air flow passing from said inlet to said outlet,
said filter media having an inlet face in communication with said inlet port and
an outlet face in communication with said outlet port,
wherein said air flow through said filter media develops a pressure drop across said filter media, said pressure drop inducing a deflection force urging said filter media to deform from said desired shape,
a supplemental filter media support insert including:
at least one elongated support rib in said clean air side, positioned proximate to and extending across said outlet face,
said ribs configured to supportively resist deformation of said filter media by transferring at least a portion of said deflection force to said housing;
wherein said housing comprises:
a first housing portion including said inlet port and said dirty air side of said chamber;
a second housing portion including said outlet port and said clean air side of said chamber;
wherein said first and second housing portions are configured and adapted to closeably mate to form said air cleaner housing;
wherein said second housing portion further comprises at least one mounting feature secured to an interior wall of said second housing portion; and
wherein opposing ends of said support ribs engage with said mounting features to transfer said at least a portion of said deflection force to said air cleaner housing;
wherein said filter media comprises pleated filter media;
said filter element includes at least one reinforcement band extending over at least a portion of said pleats at said outlet face; and
wherein at least a portion of said support ribs are positioned and aligned for supportive engagement with at least one of said reinforcing bands, said aligned ribs having a width across said outlet face no greater than a width of said aligned reinforcing band, said positioning, alignment and rib width selected to avoid further restriction of air flow through said filter element.

9. The air cleaner of claim 8, further comprising:
at least one transverse rib crossing over and joined to at least one of said support ribs;
wherein said support ribs are aligned in a first direction and positioned in a spaced parallel arrangement;
wherein said transverse ribs are aligned in a second direction and positioned in a spaced parallel arrangement; and
wherein said first and said second directions are chosen such that an angle between said first and second directions is between 10 and 90 degrees.

10. The air cleaner of claim 9 wherein
at least one of the support ribs or transverse ribs is secured to said mounting features by heat staking.

11. An air cleaner comprising:
an air cleaner housing including:
a first housing portion including and air inlet port;
a second housing portion including an air outlet port;
wherein said first and second housing portions are configured and adapted to closeably mate to form said air cleaner housing, said mated housing portions defining a chamber therein in communication with said inlet and outlet ports;
an air filter element received in said chamber and dividing said chamber into clean and dirty chamber portions,
said filter element having a pleated filter media configured to filter air flow passing from said inlet to said outlet,
said filter media having an inlet face in communication with said inlet port and an outlet face in communication with said outlet port,
wherein said air flow through said filter media develops a pressure drop across said filter media, said pressure drop inducing a deflection force urging said filter media to deform;
a supplemental filter media support insert including:
a periphery band sized and configured to be received into and receive support from said second housing portion;
said periphery band defining an air flow permeable space interior to said band; and
at least one elongated support rib in said chamber at said clean air side and secured at opposing ends to said periphery band, said support ribs positioned proximate to and extending across said outlet face and configured to supportively resist deflection of said filter media by transferring at least a portion of said deflection force to said housing;
wherein said filter element includes at least one reinforcement band extending over and secured to at least a portion of said pleats at said outlet face;
wherein at least a portion of said support ribs are positioned and aligned for supportive engagement with said reinforcing bands,
   said aligned ribs having a width across said outlet face no greater than a width of said engaging reinforcing band,
   said positioning, alignment and rib width selected to avoid further restriction of air flow through said filter element; and
wherein said periphery band is secured within said second housing by one of: snap fit installation, friction welding, adhesives.

12. The air cleaner of claim 11, further comprising:
at least one transverse rib crossing over and joined to at least one of said support ribs;
wherein said support ribs are aligned in a first direction and positioned in a spaced parallel arrangement;
wherein said transverse ribs are aligned in a second direction and positioned in a spaced parallel arrangement; and
wherein said first and said second directions are chosen such that an angle between said first and second directions is between 10 and 90 degrees.

* * * * *